Oct. 4, 1927.  
J. S. ALSPAUGH  
GEAR SHIFT MECHANISM  
Filed Nov. 15, 1922

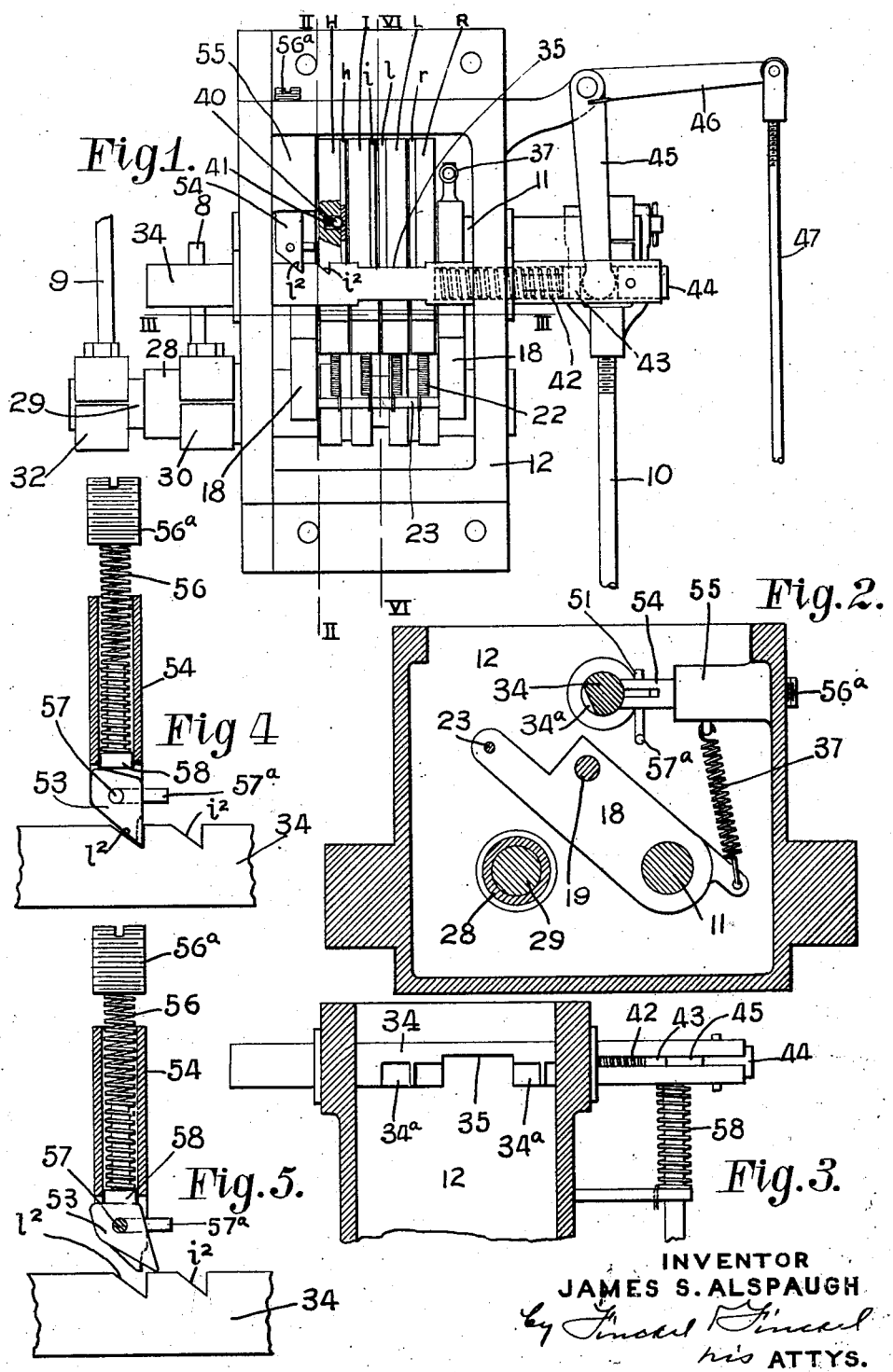

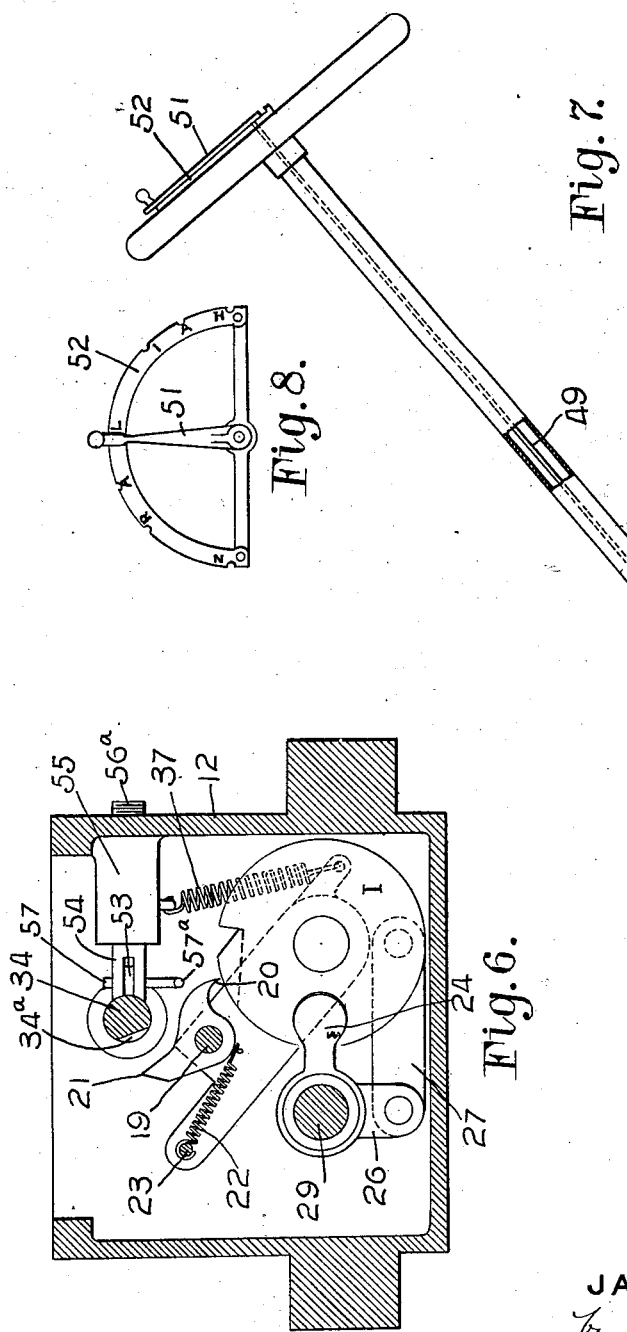

INVENTOR  
JAMES S. ALSPAUGH  
his ATTYS.

Patented Oct. 4, 1927.

1,643,935

UNITED STATES PATENT OFFICE.

JAMES S. ALSPAUGH, OF PORTSMOUTH, OHIO.

GEAR SHIFT MECHANISM.

Application filed November 15, 1922. Serial No. 601,161.

The present invention relates more particularly to a motor vehicle gear shift mechanism of the sliding type such as used, for example, in the "Cadillac" and many other cars. In this sort of mechanism a hand lever has commonly been employed to shift the gears into low, intermediate, high and reverse, there being two rods, one of which is shifted to obtain low or reverse, and the other shifted to obtain intermediate or high. I have heretofore invented several varieties of mechanism for shifting these rods by operation of the clutch lever and thereby dispensing with the hand lever for performing these operations. One such mechanism is shown and described in Letters Patent of the United States No. 1,456,496, dated May 29, 1923. Such mechanism included briefly stated two pairs of toothed gear shift rod operating disks or levers the members of each pair being connected together and to a rock shaft to cause, when alternately advanced, a back and forth motion of its shaft and accordingly shift the rod, a rocking frame carrying pawls for actuating said toothed levers, and a shiftable selector bar having a notch or recess adapted to be moved to position to permit passage of the appropriate one only of the pawls to actuate the desired gear shift rod operating disk or lever for selective operation; to permit the passage of first one and then an adjoining one of said pawls for automatic or back and forth operation of one or both of the gear shifting rods. In the description of the mechanism of the aforesaid patent I suggested that the selector bar could be operated manually, if desired at the steering wheel. The object of the present invention is a realization of that suggestion in simple and effective form whereby the position of the selector bar can be conveniently either manually controlled at will or can be set for the progressive movement into its several proper positions for permitting automatic shifting the gears from low to high by successive actuations merely of the clutch lever or an equivalent thereof.

The invention is embodied in the construction herein shown and described the features of novelty being finally claimed.

In the accompanying drawings—

Figure 1 is a top plan view of the gear shift mechanism and the present invention applied thereto with parts broken off and omitted.

Fig. 2 is a section on the line II—II Fig. 1.

Fig. 3 is a section on the line III—III Fig. 1.

Fig. 4 is a detail partly in section and partly in plan view showing the latch for latching the selector bar with the latch engaged.

Fig. 5 is a similar view showing the latch disengaged.

Fig. 6 is a section on the line VI—VI Fig. 1.

Fig. 7 is mainly a side elevation showing the means whereby the position of the selector bar is controlled from the steering wheel.

Fig. 8 is a detail in plan view showing the control lever at the steering wheel and the marked segments in connection with which said control lever is operated.

Figure 9:
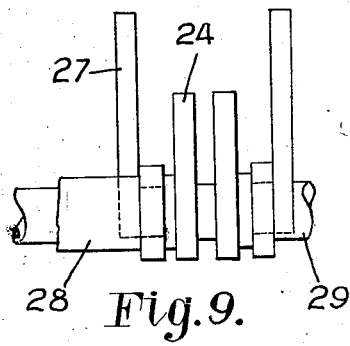
Fig. 9 is a detail showing the shafts for operating the gear shift rods and the bell crank levers and connected links that are actuated by the gear shift rod operating disks or levers.
Figure 10:
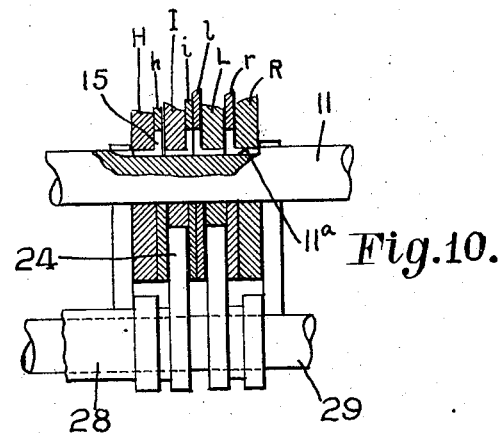
Fig. 10 is a detail partly in section of the said disks showing the shafts, bell crank levers and links and their relation to the disks.
Figure 11:
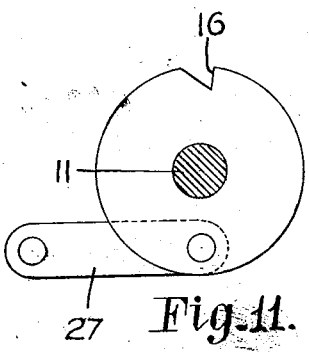
Fig. 11 is a side view of the link-carrying gear shift rod operating disk.
Figure 12:
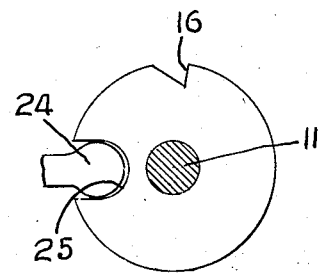
Fig. 12 is a similar view of its companion disk, said disk directly engaging an arm of the bell crank lever.
Figure 13:
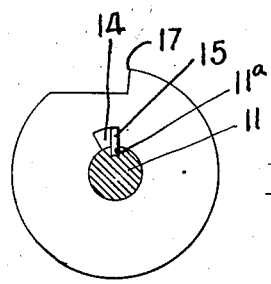
Fig. 13 is a side view of one of the thin or bridging disks they being all alike.

A proper understanding of the relation of the selector bar controlling and operating devices requires, I think, a somewhat detailed description of the gear shifting mechanism and its operation hence I shall first describe that mechanism.

In the several views 9 designates the low and reverse gear shifting rod, 8 designates the second and high gear shifting rod. These rods are those commonly present in gear shifting mechanisms of the kind particularly referred to, said rods being suitably modified, if necessary, for connection with the operating means. As in the former construction of the patent referred to the rods 9 and 8 in the present invention are operated by the forward stroke of the usual clutch lever, a rod 10 being connected with the foot pedal arm of that lever at the proper point for that purpose.

11 designates a shaft journaled in a suitable housing 12 to which shaft the rod 10 is connected by a crank arm 13 so that upon pushing the clutch lever out with the foot said shaft is rocked in the forward direction and upon releasing said lever of pressure said shaft is rocked in a rearward direction due to the action of the usual clutch spring for engaging the clutch.

The shaft 11 has loose upon it two pairs of thick rod shifting disks suggestingly designated L, and R, and I and H. Each of said disks has a companion thin disk designated l, r, i and h respectively. These thin disks are termed "bridging" disks or members. The bridging disks are each provided with a sector slot 14 into which projects a pin 15, said pin being conveniently one arm of an L-shaped member the other arm being set in a square key way 11ª in the shaft 11 to hold the pin in the fixed position as shown. The arm in the key way is conveniently located under and held from escape by the companion thick disk, the thick disk rocking over it. A face of each thick disk is provided with a spring actuated latching ball 40 to engage either of two shallow sockets 41 in the companion bridging disk to yieldingly hold the bridging disk in the position to which shifted in relation to the thick disk. The gear shift rod operating disks R, L, I, H, are each made with a short notch to form a tooth 16 while each of the bridging disks is made with a long notch to form a tooth 17. In the several positions of the two gear shift rods 9 and 8 the teeth of all the disks stand in the same horizontal line.

Secured to the shaft 11 at the opposite sides of the grouped disks are the end members 18 of a frame for carrying pawls for actuating the respective disks said frame members having secured between them a shaft 19 on which the pawls are pivoted. The said pawls are each formed with a beak 20 of such width as to engage the teeth 16 and 17 referred to and a tail 21 for the purpose hereinafter explained. The beaks of the pawls are each held normally toward the rim of the disks by means of coil springs 22 secured to the pawls and to a small rod 23 secured between the free ends of the frame members 18.

The members of each of the two pairs of the thick disks are connected for reciprocal operation in contrary directions that is to say when one disk of a pair is moved forward the other disk is moved rearward by means of a bell crank lever having one arm 24 reaching into a radial slot 25 in one of the disks and its other arm 26 connected by means of a link 27 with the companion disk. The bell crank lever of the R and L disks is secured to a solid rock shaft 29 while the bell crank lever of the I and H disks is secured on a hollow rock shaft 28 telescoped on the solid shaft 29 both shafts being journaled in the housing 12. A crank arm 30 secured to the hollow shaft 28 is suitably connected with the intermediate and high gear shift rod 8 while a crank arm 32 secured to the solid shaft 29 is suitably connected with the low and reverse gear shift rod 9.

34 designates the selector bar or gate. This bar 34 is arranged to slide in the housing 12 in the path of movement of the tails 21 of the pawls, said bar, however, being provided with a notch 35 adapted to permit the passage upward of either one or two of the pawls for engagement with the teeth 16 and 17 of the disks to carry them forward beyond the neutral position according to the selected position of the notch 35. Contact of the tail 21 with the lower side of the bar is designed to withdraw the beak of the pawl from any tooth and leave the disk at neutral position. The selector bar as herein shown is provided with special means as hereinafter set forth within convenient reach of the driver of the vehicle for shifting it back and forth into any of the positions necessary for permitting the actuation of the gear shift rods. The selector bar can thus be shifted for selective operation to bring its notch 35 into position to permit the operation of any one of the pawls and the disk it is to operate when the clutch lever is pushed forward. When the notch 35 is moved to a position where it permits the passage of two pawls but the operation of one only of the thick disks for the reason to be hereinafter explained in connection with the description of automatic shifting as distinguished from selective shifting.

37, 37 designates springs connecting the pawl carrying frame 18 with the housing said springs merely supplementing the action of the usual clutch operating spring before referred to and not shown.

The selector bar as shown in Fig. 1 is set for actuating the "low" disk L and its companion bridging disk l. Upon pushing the clutch rod 10 all the pawls are raised but only the pawl for actuating the disks L and l passes through the notch 35 and therefore only the teeth of said disks L and l are engaged to rotate said disks. The rotation of the disk L forward shifts the rod 9 forward to secure low speed. It will be noted that this operation rotates the disk R rearward carrying its tooth below neutral position but being loose on the shaft 11 it rotates idly. It will be noted that all the bridging disks are moved forward because connected (though with the indicated lost motion) with the shaft 11. Upon the retraction of the clutch rod 10 after said operation the disk L and the rod 9 are left where thus placed but the thin bridging disks are all rotated rearward to neutral position thereby closing the opening at one side of the notch forming the tooth 16 in the advance thick disk L and forming a bridge on which the pawl will ride upon a repetition of the stroke. It will be remembered that upon the first forward stroke as just described the thick disk R, because connected with the disk L, stands shifted rearward placing its tooth below the neutral position. Hence a second forward stroke of the clutch lever with the selector set for low as described will permit the proper pawl to engage the R or reverse disk and carry it to neutral position only, because the tail of the pawl contacts with the lower side of the selector bar and disengages the beak of the pawl at that position. To go into reverse the selector bar 34 is shifted to the left two notches to permit the passage of the pawl with the beak engaged with the R disk to carry it beyond the neutral position.

It is often desirable to shift back and forth past neutral between two gears as, for example, between high and intermediate when traveling through hilly or mountainous country, or between low and reverse when working for a position near a curb or when preparing to turn around in a narrow road. In such a case it is necessary that the selector bar be first moved to permit the shifting of one only of the rod shifting thick disks and then move the selector bar to the proper intermediate position and setting or holding it to permit the passage of both pawls for operating adjacent thick disk. When the desired thick disk is advanced by the passage and actuation of one only of the pawls the companion thick disk and its bridging disk are retrograded to position below neutral with the tooth 16 of the retrograded disk exposed for actuation. Upon the return movement of the pawls in this operation the bridging disk of the advanced thick disk is drawn rearward (by the pin 15) sufficiently to bridge the gap forming the tooth 16 of such advanced disk hence when such rearwardly placed disk is advanced the actuating pawl of that disk passes inertly over that tooth. When the second thick disk is advanced the first operated thick disk and its bridging disk are similarly retrograded to in rear of neutral and the operation repeated. This last described operation I term automatic.

Where the selector bar 34 extends beyond the housing 12 at the right hand side as viewed in Figs. 1 and 3 it is made as a slotted tube containing a coiled spring 42 abutting at its inner end against the end wall of the tube, said spring containing at its other end a pin having a head 43. The outer end of the tubular portion referred to is provided with a plug 44 pinned thereto. Between the head 43 and the plug 44 and through the slot of the tube extends the end of the upper arm 45 of a bell crank lever journaled vertically in suitable brackets on the side of the main housing 12. The lower end 46 of the bell crank lever has threadedly connected to it, so as to be adjustable, a rod 47 extending forwardly in the vehicle to a point near the stationary steering post housing where it is pivotally connected with a sector gear 48 journaled to or near said steering post housing. The steering post housing is provided with a longitudinal shaft 49 having fixed to its lower end a pinion 50 operably engaging the sector gear 48, and fixed to said rod at its upper end is an operating lever or arm 51 working over a sector 52 fixed to the steering post housing. When the arm 51 is swung back and forth the bell crank arm 45 is, through the described connections, correspondingly swung back and forth with a tendency to correspondingly shift the selector bar or to compress or permit the expansion of the spring 42 as hereinafter explained. The sector 52 is suitably marked, as with the letters R, L, I, and H to indicate the point the arm is to be moved under certain conditions when reverse, low, intermediate and high speeds or motions of the vehicle are to be obtained, and with the letters A when the operation of the gear shift rods is to be automatic between gears by operation of the clutch lever alone, and with the letter N to secure neutral position of the gear shift rods.

The selector bar 34 is provided with two ratchet notches $l^2$ and $i^2$ adapted to be engaged by a tooth 53 carried between the forked end of a tube 54 sliding in a tubular boss 55 on the housing and pushed forward toward the selector bar by a coil spring 56. The pressure of the coil spring 56 is regulated by a screw 56$^a$. The tooth or latch 53 is pivoted on a pin 57 fixed with reference to the tube 54 and the rear edge of the tooth is pressed by the head of a pin 58 in the forward end of the coil spring 56. The tooth 53 can be oscillated on the pin 57 when not restrained by its engagement with the notch $l^2$ or $i^2$; and when so engaged the rear edge of the tooth is tilted with reference to the head of the pin 58 so that when the tooth is released from the notch its point is thrown to one side as shown in Fig. 5. When in operation the tooth is pushed from the notch and then released it returns by the action of the spring to rest on the face of the bar 34 as indicated in Fig. 5. As shown the form of the notches $l^2$ and $i^2$ and the form of the tooth and its yielding mounting are such that the selector bar can be shoved directly from its high to low operating positions but not from low to high position without intermittently removing the tooth. The pin 57 has a lateral extension 57$^a$ projecting into the path of the end member 18 of the pawl carrying frame so that when that frame is moved to shift the gears it strikes the projection 57ª and presses the tooth 53 out of engagement with the notch leaving the selector bar free to be moved after a retraction of the pawl carrying frame. If the spring 42 has been placed under full tension by swinging the arm 51 to the "high" mark H on sector 52 and while the tooth 53 is engaged with the notch $l^2$ holding the selector bar 34 in "low" successive actuation of the clutch lever causes an automatic and intermittent movement of the selector bar thereby permitting a progressive change of the speeds from "low" to "high" without any further manipulation of the arm 51. To prevent the selector bar from prematurely sliding under the influence of the spring 42 when the tooth 53 is shoved out, as just described, the forward side of said bar is made with recesses 34ª located to be engaged by the disk operating pawls 20—21 before the tooth 53 escapes from the notch thereby insuring its engagement with the next notch (if there be such) as for example the notch $i^2$ in the successive operation just referred to. The spring 42 is made of sufficient power to shove the selector bar to "high" position when the arm 51 is set at the H mark on sector 52. The selector bar when thus shoved is stopped at high position by contact of plug 44 with the end of arm 45 hence no notch such as $l^2$ or $i^2$ is required on the bar when in "high" position, and when the bar has been moved to that position under the influence of the spring 42 or otherwise, the tooth 53 merely rests on the unnotched portion of the bar to the right of the notch $i^2$ as shown in Fig. 1 and in the manner shown in Fig. 5. When the arm 51 is swung to N or neutral position the tooth 53 rides out the notch and rests on the side of the selector bar beyond the notch $l^2$ and either low or reverse may be directly obtained by swinging the arm to the point L and R on the sector 52 according to the speed or motion desired. And the bar 34 can be stopped at the intermediate point between "low" and "reverse" by swinging the arm 51 to the A point on the sector 52 there being no compression of the spring 42 between such positions. Successive actuations of the projection 57ª by the clutch lever are required to release the bar from "high" to "low" if the arm 51 is left at H but if that arm is located at some other point as for example at I or at A between the I and H points the bar is arrested at such point because of the abutment of the plug 44 against the arm 45. When the selector bar is to be placed for automatic or back and forth movements of the gear shift rods between intermediate and high the arm 51 after an operation of the gear shift rod at H and I to stand at A between those marks of the sector as set forth for automatic operation of the gear shift rods. In this position the tooth 53 rests on the side of the selector bar as before indicated.

When the arm 51 is thrown to the N position on the sector 52 the selector bar 34 is thrown to the extreme right as viewed in Fig. 1 thereby placing the bar 34 in position where none of the pawls can carry a rod operating disk beyond the neutral position because the tails of all the pawls strike the lower side of the said bar and any engaged beak thus disengaged from the disk at the neutral position.

The selector bar can, of course, be fed from low to high by progressive movement of the arm 51 and successive operations of the clutch lever, but such an operation is unnecessary because of the automatic feed of the bar obtained by preliminary complete compression of the spring 42 by swinging the arm 51 directly to the H mark.

The spring at 58 prevents loose motion of the bell crank lever and parts connected therewith.

The forms of the parts can be changed without departing from the gist of the invention as claimed.

What I claim is:

1. In a motor vehicle having a foot lever, the combination of a gear shift mechanism, selector means therefor consisting of a longitudinally movable notched bar, means operable by the driver for predetermining the position of said bar, latching means for automatically interrupting the movement of said bar and means operable by the foot lever for releasing said latching means and said bar.

2. In a motor vehicle having a foot lever, the combination of a gear shift mechanism, a longitudinally movable selector means for controlling the operation of the gear shift mechanism, a tension member for actuating the same, means operable by the driver for predetermining the position of the selector means and placing said selector means under tension, means for latching the selector means, and means operable by the foot lever for shifting the gears and releasing the latching means whereby progressive movement of the selector means permits successive gear shifting.

3. In a motor vehicle having a foot lever, the combination of a gear shift mechanism of the kind described comprising a plurality of gear shift operating levers, means actuated by the foot lever comprising a movable frame carrying pawls to engage said levers, a movable bar for controlling the action of each of said pawls, a spring for moving said bar in one direction, a latch for interrupting the movement of said bar in said direction, means for releasing said latch at will and means extending to within reach of the driver of the vehicle for shifting the position of said bar to selectively permit the operation of said levers and to place said spring under tension.

4. In a motor vehicle having a foot lever, the combination of a gear shift mechanism of the kind described comprising a plurality of gear shift operating levers, means actuated by the foot lever comprising a movable frame carrying pawls to engage said levers, a movable bar for controlling the action of each of said pawls, a spring for moving said bar in one direction, a latch for interrupting the movement of said bar in said direction, means actuated by the foot lever to release said latch and means extending to within reach of the driver of the vehicle for shifting the position of said bar to selectively permit the operation of said levers and to place said spring under tension.

5. In a motor vehicle having a foot-lever the combination of a gear shift mechanism of the kind described comprising a plurality of gear shift operating levers, means actuated by the foot lever comprising a movable frame carrying pawls to engage said levers, a movable bar for controlling the action of each of said pawls, a spring for moving said bar in one direction, a latch for interrupting the movement of said bar in said direction, means actuated by the foot lever for releasing said latch simultaneously with its actuation of the pawl carrying frame, and means extending to within reach of the driver of the vehicle for shifting the position of said bar to selectively permit the operation of said levers and to place said spring under tension.

6. In a motor vehicle, the combination of a gear shift mechanism of the kind described comprising a plurality of gear shift operating levers, a movable frame carrying a plurality of pawls to engage said levers to shift the gears, a bar cooperating with said pawls and adapted to be moved to permit the passage of either one or two of said pawls for actuating said levers, a spring for moving said bar in one direction, a latch for said bar operated by said pawl carrying frame, means in connection with the steering post housing for setting said bar for the selective operation of either one or two of said pawls, and foot operated means for actuating said pawl carrying frame.

7. In a motor vehicle, the combination of a gear shift mechanism of the kind described comprising a plurality of gear shift operating levers, a movable frame carrying a plurality of pawls to engage said levers to shift the gears, a selector bar cooperating with said pawls and adapted to be moved to permit the operation of either one or two of said pawls for actuating said levers, means for placing said bar under tension for moving the same in one direction, means for intermittently interrupting the movement of said bar when moved by said tension means, means for applying said tension and controlling the position of said bar at will, and means actuated at will for operating said pawl carrying frame.

8. In a motor vehicle, the combination of a gear shift mechanism of the kind described, a ratcheted selector bar therefor, tension means for said bar, a tooth for latching and releasing the bar for intermittent movement to positions causing progressive operation of the gear shift mechanism, manually operated means for applying tension to said tension means to shift the bar in one direction only and means whereby said bar may be shifted independently of said tension means for permitting selective operation of said gear shift mechanism.

9. In a motor vehicle, the combination of a gear shift mechanism of the kind described, a ratcheted selector bar therefor, tension means for said bar, a tooth for latching and releasing the bar for intermittent movement to positions causing progressive operation of the gear shift mechanism, manually operated means operable in one direction for applying tension to said tension means and means whereby said bar may be shifted independently of said tension means in the opposite direction for causing both selective and automatic operation of said gear shift mechanism, substantially as described.

10. In a motor vehicle the combination with a plurality of gear shifting members, an actuator for each of said members, and means for operating them, a sliding selector for said actuators, a tension member for said sliding selector adapted to move it in one direction only, means operable at will for moving said sliding selector in one direction to release any of said actuators for actuation of its gear shifting member or to apply tension to said tension member, a latch for holding the selector in position to which moved, and means operable by the means for operating the actuators of the gear shift members for releasing said latch.

11. In a motor vehicle the combination of a plurality of gear shifting members, an actuator for each of said members and means for operating them, a sliding selector for said actuators, a tension member and stop for said selectors, said tension member adapted to move the selector in one direction only, means extending between said stop and tension member for moving the selector to permit actuation of the selected actuator on its gear shifting member, said means adapted to apply tension to said tension member, a latch for holding the selector in the position to which moved, and means operable by the means for operating the actuators of the gear shift members for disengaging said latch.

12. In a motor vehicle the combination of a plurality of gear shifting members, an actuator for each of said members and means for operating them, a sliding selector for said actuators, a tension member and stop for said selector, said tension member adapted to move the selector in one direction only, means extending between said stop and tension member for moving the selector to permit actuation of the selected actuator on its gear shifting member, said means adapted to apply tension to said tension member, a latch for holding the selector in the position to which moved, and means whereby said latch is reengaged to hold said selector in a new position after the actuation of the actuator.

JAMES S. ALSPAUGH.